US009946392B2

(12) United States Patent
Hu

(10) Patent No.: US 9,946,392 B2
(45) Date of Patent: Apr. 17, 2018

(54) PIXEL CIRCUIT, ORGANIC ELECTROLUMINESCENT DISPLAY PANEL AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Zuquan Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 231 days.

(21) Appl. No.: 14/800,518

(22) Filed: Jul. 15, 2015

(65) Prior Publication Data
US 2016/0132171 A1 May 12, 2016

(30) Foreign Application Priority Data
Nov. 6, 2014 (CN) .......................... 2014 1 0624058

(51) Int. Cl.
G06F 3/041 (2006.01)
G09G 3/32 (2016.01)
(Continued)

(52) U.S. Cl.
CPC ........ G06F 3/0416 (2013.01); G02F 1/13338 (2013.01); G06F 3/044 (2013.01);
(Continued)

(58) Field of Classification Search
CPC ...... G06F 3/0416; G06F 3/044; G06F 3/0412; G09G 3/3258; G09G 2300/0809;
(Continued)

(56) References Cited

U.S. PATENT DOCUMENTS

2007/0040772 A1 2/2007 Kim
2014/0313138 A1 10/2014 Jeong et al.
(Continued)

FOREIGN PATENT DOCUMENTS

CN 103295525 A * 9/2013 ........... G09G 3/3233
CN 103354078 A * 10/2013 ............. G06F 3/042
(Continued)

OTHER PUBLICATIONS

First Chinese Office Action (including English translation) dated Feb. 19, 2016, for corresponding Chinese Application No. 201410624058.3.

Primary Examiner — Amare Mengistu
Assistant Examiner — Jennifer Zubajlo
(74) Attorney, Agent, or Firm — Kinney & Lange, P.A.

(57) ABSTRACT

The present disclosure provides a pixel circuit, an organic electroluminescence display panel and a display apparatus. The pixel circuit initializes a first node during an initialization period of a touch control phase and a display phase; adjusts a voltage at the first node during a touch sensing period of the touch control phase; causes a driver module to output a touch control signal under the control of the voltage at the first node during a touch reading period of the touch control phase, so as to achieve a touch control function; writes data into the first node during a compensating period and a data writing period of the display phase; and causes the driver module to drive a light emitting device in a light emitting module to emit light during a light emitting period of the display phase, so as to allow the light emitting device to achieve its light emitting function normally. Compared with the conventional pixel circuit, the pixel circuit according to the embodiment of the present disclosure has integrated touch control and display functions. In this way, the manufacture cost can be saved when compared with the separated provided display driver circuit and touch control (Continued)

circuit, so as to simplify the circuit structure and to reduce the thickness of the display panel.

17 Claims, 7 Drawing Sheets

(51) Int. Cl.
*G06F 3/044* (2006.01)
*G09G 3/3258* (2016.01)
*G02F 1/1333* (2006.01)

(52) U.S. Cl.
CPC ......... *G06F 3/0412* (2013.01); *G09G 3/3258* (2013.01); *G09G 2300/0809* (2013.01); *G09G 2300/0842* (2013.01); *G09G 2310/08* (2013.01); *G09G 2360/147* (2013.01); *G09G 2360/148* (2013.01)

(58) Field of Classification Search
CPC ....... G09G 2300/0842; G09G 2310/08; G09G 2360/147; G09G 2360/148; G02F 1/13338
See application file for complete search history.

(56) References Cited

U.S. PATENT DOCUMENTS

2015/0103037 A1* 4/2015 Wu ..................... G09G 3/3233
345/174
2015/0302801 A1* 10/2015 Tan ........................ G06F 3/042
345/173

FOREIGN PATENT DOCUMENTS

CN 103413523 A 11/2013
CN 203300191 A 11/2013

* cited by examiner

PIXEL CIRCUIT, ORGANIC ELECTROLUMINESCENT DISPLAY PANEL AND DISPLAY APPARATUS

This application claims priority to the Chinese Patent Application No. 201410624058.3, filed on Nov. 6, 2014, entitled "PIXEL CIRCUIT, ORGANIC ELECTROLUMINESCENCE DISPLAY PANEL AND DISPLAY APPARATUS" which is incorporated herein by reference in its entirety.

TECHNICAL FIELD

The present disclosure relates to display technology, and more particularly, to a pixel circuit, an organic electroluminescence display panel and a display apparatus.

BACKGROUND

With the development of display technology, Organic Light Emitting Diode (OLED) display has become one of the hot spots in nowadays researches of panel displays. More and more Active Matrix Organic Light Emitting Diodes (AMOLEDs) become available in the market. Compared with conventional Thin Film Transistor Liquid Crystal Displays (TFT LCDs), AMOLEDs have higher response speed, greater contrast and wider view angle.

Currently, as display devices evolve towards slimness, high resolution, intelligence and power saving, touch screen panels have become increasingly popular. Typically, touch screen panels may include resistive, capacitive, optical or sound-wave-based panels. Among various touch screen panels, in-cell touch panels, which have touch control components embedded within display screens, have been attractive to major panel manufacturers due to their reduced overall module thickness and significantly lowered manufacture costs of touch screens. OLEDs have also been attractive due to their advantages of low power consumption, high luminance, low cost, wide view angle and high response speed.

In the conventional in-cell touch sensitive OLED panel, a circuit for display drivers and a circuit for touch control driver are designed separately. That is, one circuit is provided for touch control functions and another for display driving functions for the OLEDs. However, with such separate designs for the display driver circuit and the touch control circuit, there will be disadvantages such as complicated circuit structure, high manufacturer cost, heavy display screen and thick panel.

SUMMARY

The embodiments of the present disclosure provide a pixel circuit, an organic electroluminescence display panel and a display apparatus, capable of implementing a pixel circuit with integrated touch control and display functions.

According to an embodiment of the present disclosure, a pixel circuit is provided. The pixel circuit comprises an initialization module, a charging control module, a driver module, a touch sensor module, a touch reading module and a light emitting module having a light emitting device. The driver module has a control terminal connected to a first node, an input terminal connected to a second node and an output terminal connected to an input terminal of the light emitting module; the charging control module has a control terminal connected to a scan signal terminal, an input terminal connected to a data signal terminal and an output terminal connected to a third node; the initialization module is connected among the first node, the second node, the third node, a first reference signal terminal, a first signal control terminal and a second signal control terminal; the touch sensor module is connected among the first node, a third signal control terminal and a second reference signal terminal; the touch reading module has a control terminal connected to a fourth signal control terminal, an input terminal connected to the data signal terminal and an output terminal connected to the second node; the light emitting module has a control terminal connected to a fifth signal control terminal and an output terminal connected to the second reference signal terminal and to a signal detection output terminal.

During an initialization period of a touch control phase and a display phase, the initialization module, under the control of the first signal control terminal and the second signal control terminal, and the charging control module, under the control of the scan signal terminal, initialize the first node. During a touch sensing period of the touch control phase, the touch sensor module adjusts a voltage at the first node based on a touch control state under the control of the third signal control terminal; during a touch reading period of the touch control phase, the touch reading module connects the data signal terminal and the second node under the control of the fourth signal control terminal and the light emitting module connects the output terminal of the driver module and the signal detection output terminal under the control of the fifth signal control terminal to cause the driver module to output a touch control signal under the control of the voltage at the first node. During a compensating period and a data writing period of the display phase, the charging control module, under the control of the scan signal terminal, and the initialization module, under the control of the first signal control terminal and the second signal control terminal, write data into the first node; during a light emitting period of the display phase, the initialization module connects the first reference signal terminal and the input terminal of the driver module under the control of the first signal control terminal to cause the driver module to drive the light emitting device in the light emitting module to emit light.

In an embodiment, the initialization module comprises: a first switching transistor, a second switching transistor and a storage capacitor. The first switching transistor has its gate connected to the first signal control terminal, its source connected to the first reference signal terminal and its drain connected to the second node. The second switching transistor has its gate connected to the second signal control terminal, its source connected to the second node and its drain connected to the first node. The storage capacitor is connected between the first node and the third node.

In an embodiment, the charging control module comprises a third switching transistor having its gate connected to the scan signal terminal, its source connected to the data signal terminal and its drain connected to the third node.

In an embodiment, the driver module comprises a driving transistor having its gate connected to the first node, its source connected to the second node and its drain connected to the input terminal of the light emitting module.

In an embodiment, the touch sensor module comprises a fourth switching transistor and a touch sensor device. The fourth switching transistor has its gate connected to the third signal control terminal, its source connected to the first node and its drain connected to a terminal of the touch sensor device. The touch sensor device has another terminal connected to the second reference signal terminal.

In an embodiment, the touch sensor device is a variable capacitor or a photosensitive diode. In the case that the touch sensor device is a variable capacitor, the variable capacitor has a terminal connected to the drain of the fourth switching transistor and another terminal connected to the second reference signal terminal. In the case that the touch sensor device is a photosensitive diode, the photosensitive diode has its anode connected to the second reference signal terminal and its cathode connected to the drain of the fourth switching transistor when a low level signal is inputted at the second reference signal terminal, or has its cathode connected to the second reference signal terminal and its anode connected to the drain of the fourth switching transistor when a high level signal is inputted at the second reference signal terminal.

In an embodiment, the touch reading module comprises a fifth switching transistor having its gate connected to the fourth signal control terminal, its source connected to the data signal terminal and its drain connected to the second node.

In an embodiment, the light emitting module further comprises a sixth switching transistor having its gate connected to the fifth signal control terminal, its source connected to the output terminal of the driver module and to an input terminal of the light emitting device, and its drain connected to an output terminal of the light emitting device, to the second reference signal terminal and to the signal detection output terminal.

According to another embodiment of the present disclosure, an organic electroluminescence display panel is provided. The organic electroluminescence display panel comprises the pixel circuit according to the above embodiments.

According to yet another embodiment of the present disclosure, a display apparatus is provided. The display apparatus comprises the organic electroluminescence display panel according to the above embodiment.

The embodiments of the present disclosure have the following advantageous effects. The present disclosure provides a pixel circuit, an organic electroluminescence display panel and a display apparatus. During an initialization period of a touch control phase and a display phase, the initialization module and the charging control module initialize a first node. During a touch sensing period of the touch control phase, the touch sensor module adjusts a voltage at the first node based on a touch control state. During a touch reading period of the touch control phase, the touch reading module connects the data signal terminal and the second node and the light emitting module connects the output terminal of the driver module and the signal detection output terminal to cause the driver module to output a touch control signal under the control of the voltage at the first node, so as to achieve a touch control function. During a compensating period and a data writing period of the display phase, the charging control module and the initialization module write data into the first node. During a light emitting period of the display phase, the initialization module connects the first reference signal terminal and the input terminal of the driver module to cause the driver module to drive the light emitting device in the light emitting module to emit light, so as to allow the light emitting device to achieve its light emitting function normally. Compared with the conventional pixel circuit, the pixel circuit according to the embodiment of the present disclosure has integrated touch control and display functions. In this way, the manufacture cost can be saved when compared with the separated provided display driver circuit and touch control circuit, so as to simplify the circuit structure and to reduce the thickness of the display panel.

DETAILED DESCRIPTION OF THE EMBODIMENTS

In the following, a pixel circuit, an organic electroluminescence display panel and a display apparatus according to the embodiments of the present disclosure will be described in detail with reference to the figures.

Figure 1:
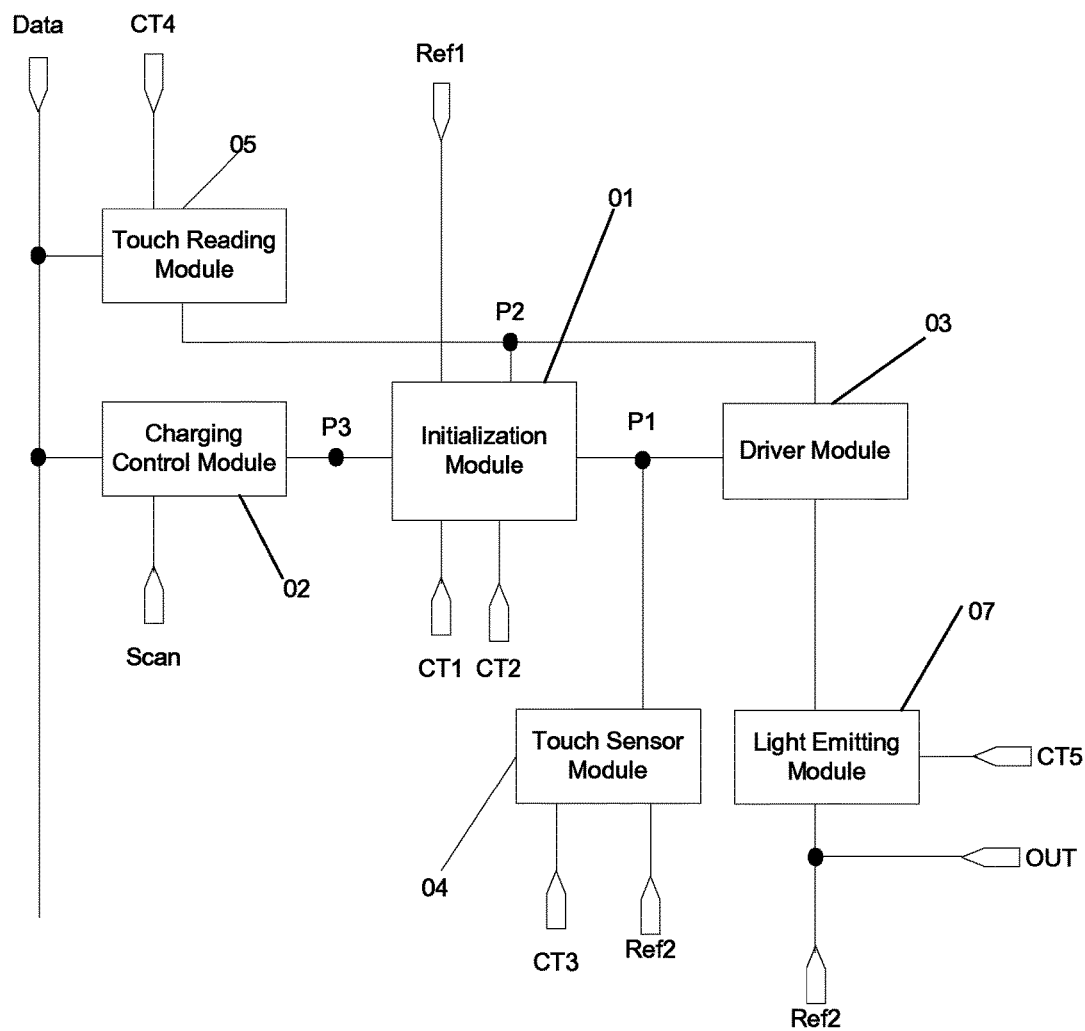
FIG. 1 is a schematic diagram showing a structure of a pixel circuit according to an embodiment of the present disclosure.

According to an embodiment of the present disclosure, a pixel circuit is provided. As shown in FIG. 1, the pixel circuit includes an initialization module 01, a charging control module 02, a driver module 03, a touch sensor module 04, a touch reading module 05 and a light emitting module 07 having a light emitting device 06.

The driver module 03 has a control terminal connected to a first node P1, an input terminal connected to a second node P2 and an output terminal connected to an input terminal of the light emitting module 07. The charging control module 02 has a control terminal connected to a scan signal terminal Scan, an input terminal connected to a data signal terminal Data and an output terminal connected to a third node P3. The initialization module 03 is connected among the first node P1, the second node P2, the third node P3, a first reference signal terminal Ref1, a first signal control terminal CT1 and a second signal control terminal CT2. The touch sensor module 04 is connected among the first node P1, a third signal control terminal CT3 and a second reference signal terminal Ref2. The touch reading module 05 has a control terminal connected to a fourth signal control terminal CT4, an input terminal connected to the data signal terminal Data and an output terminal connected to the second node P2. The light emitting module 07 has a control terminal connected to a fifth signal control terminal CT5 and an output terminal connected to the second reference signal terminal Ref2 and to a signal detection output terminal OUT.

During an initialization period of a touch control phase and a display phase, the initialization module 01, under the control of the first signal control terminal CT1 and the second signal control terminal CT2, and the charging control module 02, under the control of the scan signal terminal Scan, initialize the first node P1.

During a touch sensing period of the touch control phase, the touch sensor module 04 adjusts a voltage at the first node P1 based on a touch control state under the control of the third signal control terminal CT3. During a touch reading period of the touch control phase, the touch reading module 05 connects the data signal terminal Data and the second node P2 under the control of the fourth signal control terminal CT4 and the light emitting module 07 connects the output terminal of the driver module 03 and the signal detection output terminal OUT under the control of the fifth signal control terminal CT5 to cause the driver module 03 to output a touch control signal under the control of the voltage at the first node P1.

During a compensating period and a data writing period of the display phase, the charging control module 02, under the control of the scan signal terminal Scan, and the initialization module 01, under the control of the first signal control terminal CT1 and the second signal control terminal CT2, write data into the first node P1. During a light emitting period of the display phase, the initialization module 01 connects the first reference signal terminal Ref1 and the input terminal of the driver module 03 under the control of the first signal control terminal CT1 to cause the driver module 03 to drive the light emitting device in the light emitting module 07 to emit light.

With the above pixel circuit according to the embodiment of the present disclosure, during an initialization period of a touch control phase and a display phase, the initialization module 01 and the charging control module 02 initialize a first node P1. During a touch sensing period of the touch control phase, the touch sensor module 04 adjusts a voltage at the first node P1 based on a touch control state. During a touch reading period of the touch control phase, the touch reading module 05 connects the data signal terminal Data and the second node P2 and the light emitting module 07 connects the output terminal of the driver module 03 and the signal detection output terminal OUT to cause the driver module 03 to output a touch control signal under the control of the voltage at the first node P1, so as to achieve a touch control function. During a compensating period and a data writing period of the display phase, the charging control module 02 and the initialization module 01 write data into the first node P1. During a light emitting period of the display phase, the initialization module 01 connects the first reference signal terminal Ref1 and the input terminal of the driver module 03 to cause the driver module 03 to drive the light emitting device in the light emitting module 07 to emit light, so as to allow the light emitting device to achieve its light emitting function normally. Compared with the conventional pixel circuit, the pixel circuit according to the embodiment of the present disclosure has integrated touch control and display functions. In this way, the manufacture cost can be saved when compared with the separated provided display driver circuit and touch control circuit, so as to simplify the circuit structure and to reduce the thickness of the display panel.

In an implementation, in the above pixel circuit according to the embodiment of the present disclosure, as shown in FIGS. 2a-2d, the initialization module 01 may include a first switching transistor T1, a second switching transistor T2 and a storage capacitor C1. The first switching transistor T1 has its gate connected to the first signal control terminal CT1, its source connected to the first reference signal terminal Ref1 and its drain connected to the second node P2. The second switching transistor T2 has its gate connected to the second signal control terminal CT2, its source connected to the second node P2 and its drain connected to the first node P1. The storage capacitor C1 is connected between the first node P1 and the third node P3.

Figure 2A:
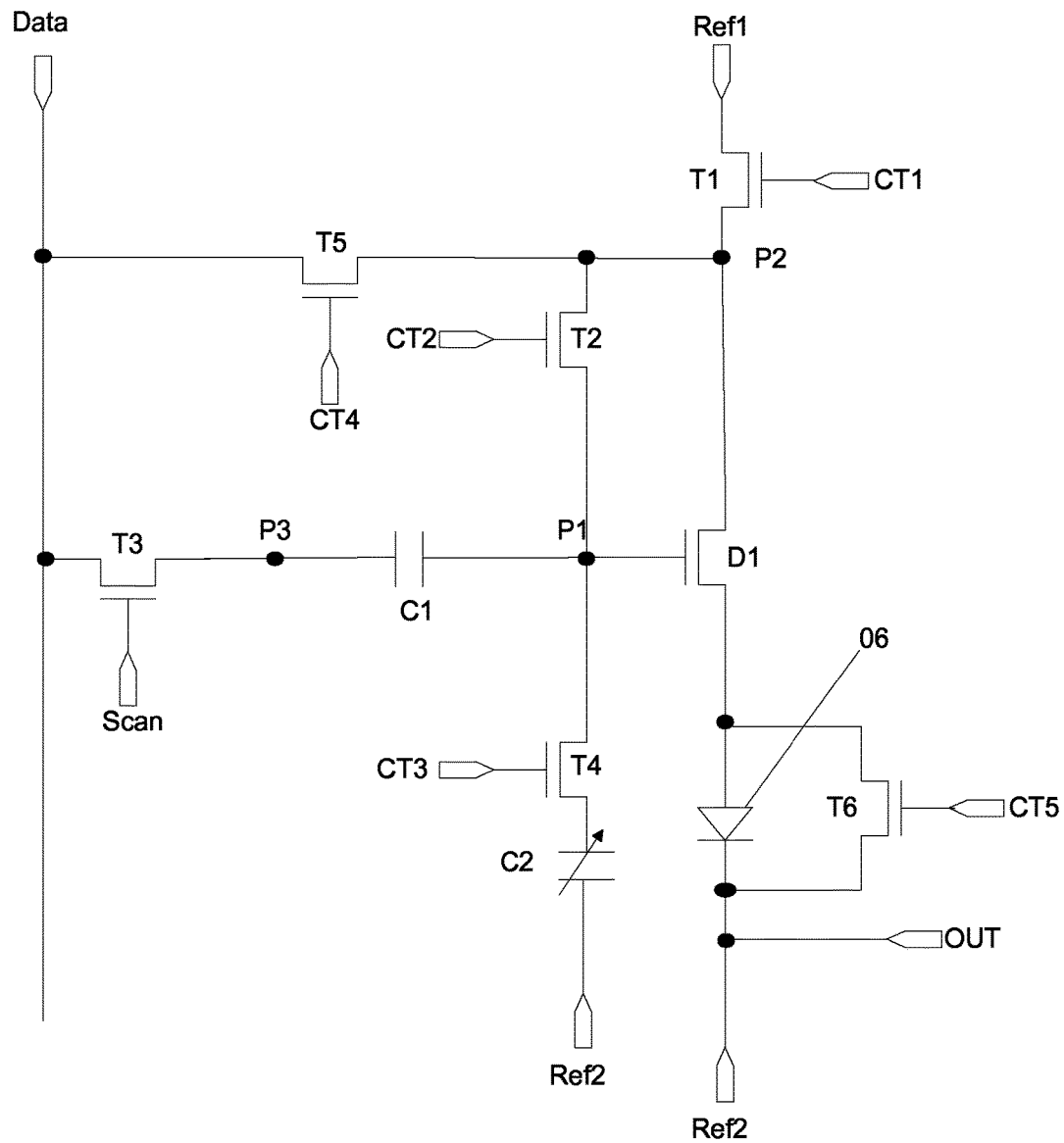
FIGS. 2a-2d are schematic diagrams each showing a structure of a pixel circuit according to an embodiment of the present disclosure.
Figure 2B:
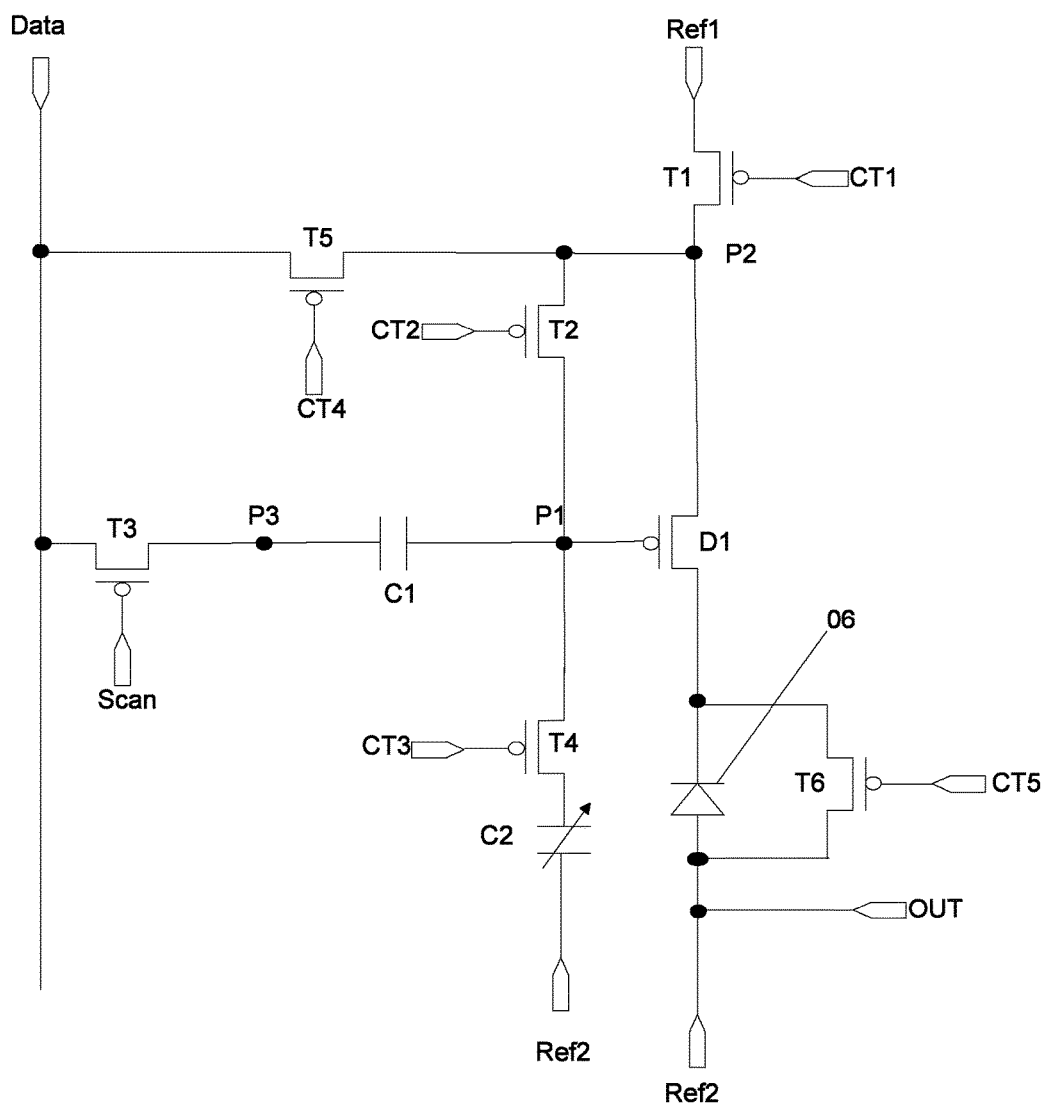
Figure 2C:
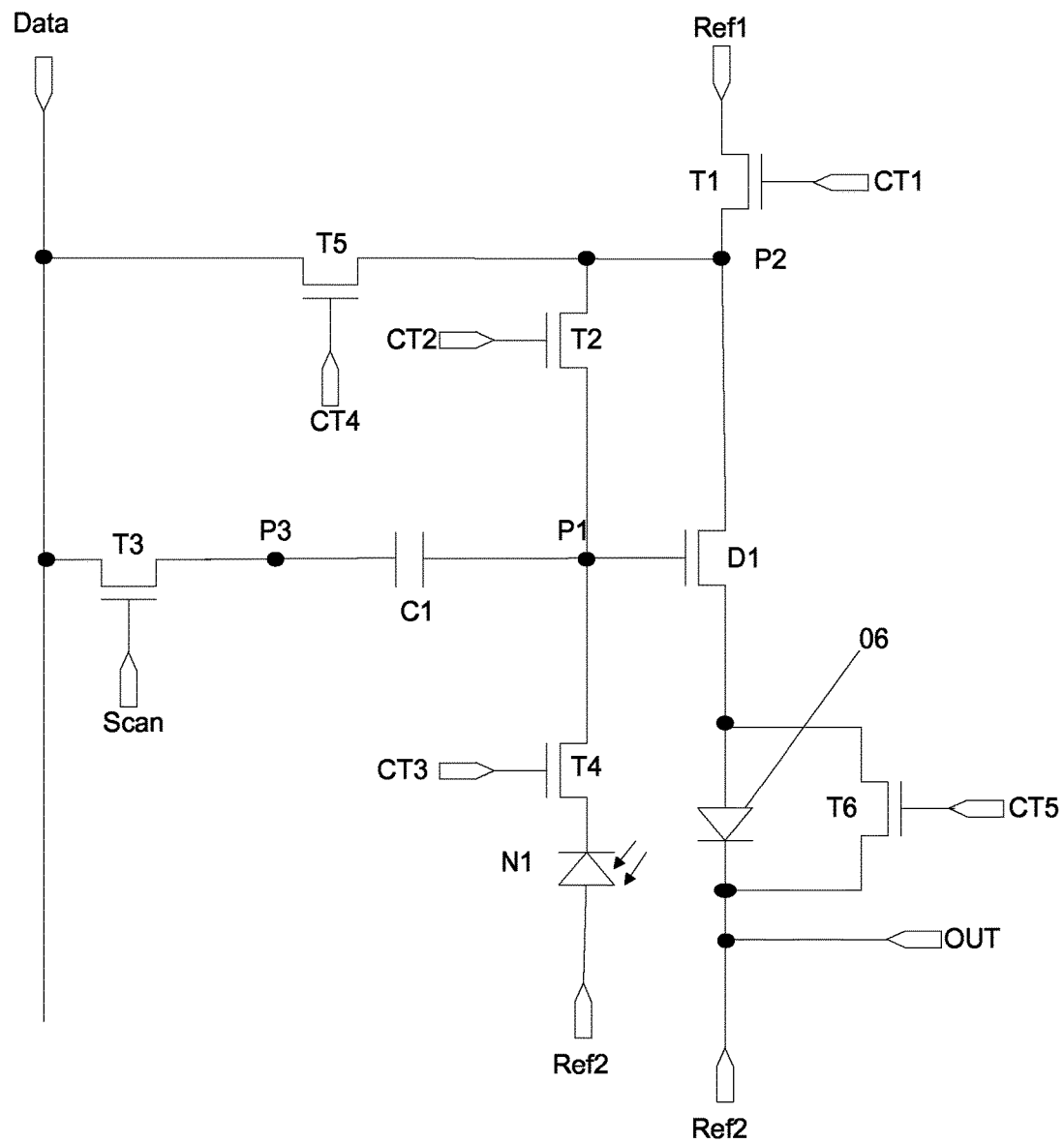
Figure 2D:
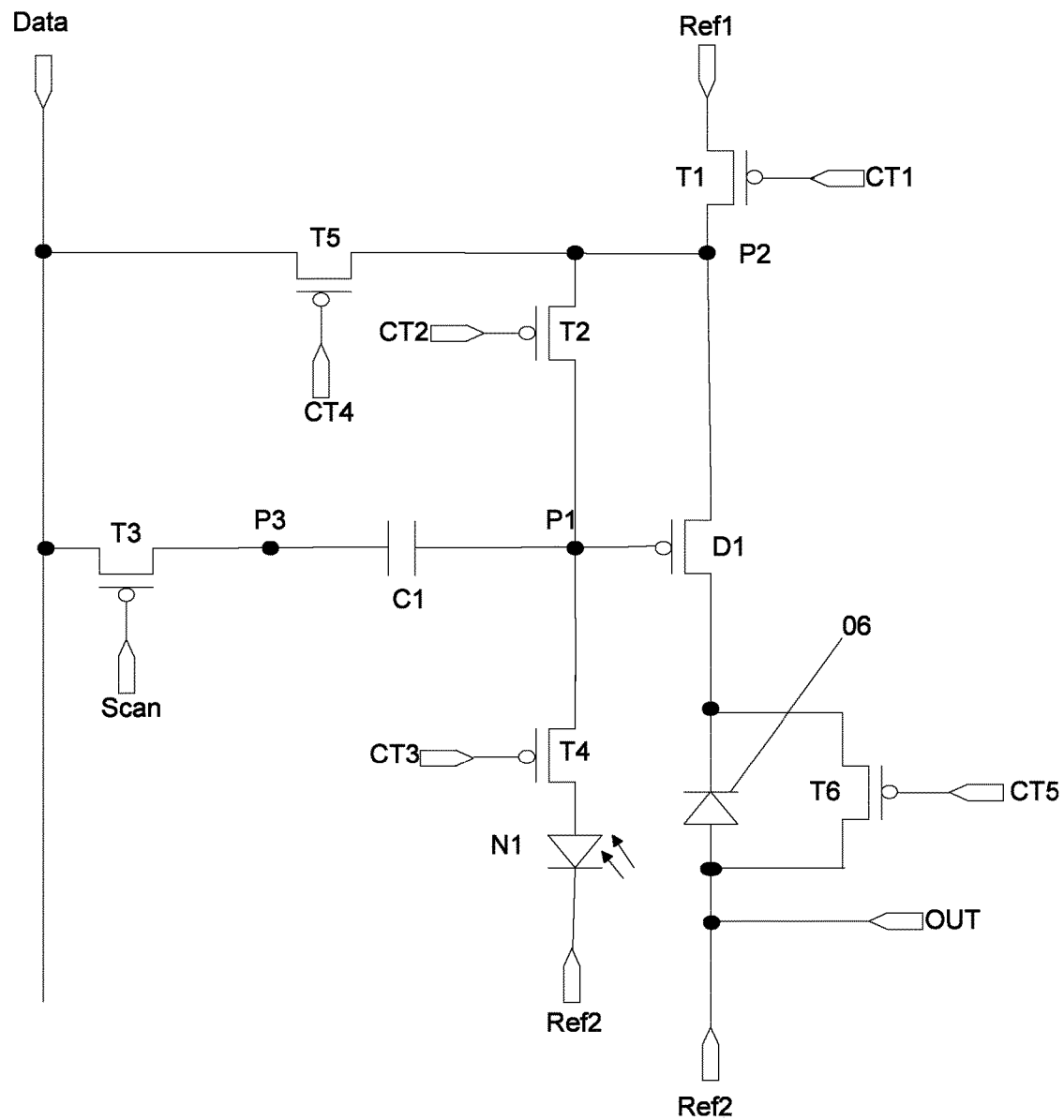

In particular, in the above pixel circuit according to the embodiment of the present disclosure, as shown in FIGS. 2a and 2c, the first switching transistor T1 and the second switching transistor T2 may be N-type transistors. Alternatively, as shown in FIGS. 2b and 2d, the first switching transistor T1 and the second switching transistor T2 may be P-type transistors. The present disclosure is not limited to any of the above types of the transistors. During the initialization period of the touch control phase and the display phase, the first switching transistor T1 and the second switching transistor T2 are turned on under the control of the first signal control terminal CT1 and the second signal control terminal CT2, respectively. The turned-on first switching transistor T1 connects the first reference signal terminal Ref1 and the second node P2, and the turned-on second switching transistor T2 on connects the second node P2 and the first node P1, such that a voltage signal at the first reference signal terminal Ref1 is transferred to the first node P1. During the compensating period of the display phase, the second switching transistor T2 is turned on under the control of the second signal control terminal CT2. The turned-on second switching transistor T2 and the driving transistor D1 constitute a discharging loop, such that the voltage at the first node P1 is discharged to a threshold voltage Vth of the driving transistor D1. During the light emitting period of the display phase, the first switching transistor T1, which is also turned on, connects the first reference signal terminal Ref1 and the input terminal of the driver module 03, such that the driver module 03 drives the light emitting device 06 in the light emitting module 07 to emit light.

In an implementation, in the above pixel circuit according to the embodiment of the present disclosure, as shown in FIGS. 2a-2d, the charging control module 02 may include a third switching transistor T3 having its gate connected to the scan signal terminal Scan, its source connected to the data signal terminal Data and its drain connected to the third node P3.

In particular, in the above pixel circuit according to the embodiment of the present disclosure, as shown in FIGS. 2a and 2c, the third switching transistor T3 may be a N-type transistor. Alternatively, as shown in FIGS. 2b and 2d, the third switching transistor T3 may be a P-type transistor. The present disclosure is not limited to any of the above types of the transistor. During the initialization period of the touch control phase and the display phase and during the compensating period and the data writing period of the display phase, the third switching transistor T3 is turned on under the control of the scan signal terminal Scan. The turned-on third switching transistor T3 connects the data signal terminal Data and the third node P3 to transfer a data signal inputted at the data signal terminal Data to the third node P3.

In an implementation, in the above pixel circuit according to the embodiment of the present disclosure, as shown in FIGS. 2a-2d, the driver module 03 may include a driving transistor D1 having its gate connected to the first node P1, its source connected to the second node P2 and its drain connected to the input terminal of the light emitting module 07.

In particular, in the above pixel circuit according to the embodiment of the present disclosure, as shown in FIGS. 2a and 2c, the driving transistor D1 may be a N-type transistor. Alternatively, as shown in FIGS. 2b and 2d, the driving transistor D1 may be a P-type transistor. The present disclosure is not limited to any of the above types of the transistor. During the initialization period of the touch control phase and the display phase, since the initialization module 01 and the charging control module 02 initialize the first node P1, the gate voltage of the driving transistor D1 is an initial voltage Vini. During the touch sensing period, the touch sensor module 04 adjusts the gate voltage of the driving transistor D1 based on the touch control state. During the touch reading period of the touch control phase, the touch reading module 05 connects the data signal terminal Data and the second node P2, the light emitting module 07 connects the drain of the driving transistor D1 and the signal detection output terminal OUT, such that the driving transistor D1 output the touch control signal to the signal detection output terminal OUT under the control of the gate voltage. During the light emitting period of the display phase, the first switching transistor T1 is in an ON state to connect the first reference signal terminal Ref1 and the source of the driving transistor D1. The voltage signal inputted at the first reference signal terminal Ref1 serves as a driving voltage to cause the driving transistor D1 to drive the light emitting device 06 in the light emitting module 07 to emit light.

In an implementation, in the above pixel circuit according to the embodiment of the present disclosure, as shown in FIGS. 2a-2d, the touch sensor module 04 may include a fourth switching transistor T4 and a touch sensor device. As shown in FIGS. 2a and 2b, the touch sensor device may be a variable capacitor C2. Alternatively, as shown in FIGS. 2c and 2d, the touch sensor device may be a photosensitive diode N1. The fourth switching transistor T4 has its gate connected to the third signal control terminal CT3 and its source connected to the first node P1. In the case that the touch sensor device is the variable capacitor C2, the variable capacitor C2 has a terminal connected to the drain of the fourth switching transistor T4 and another terminal connected to the second reference signal terminal Ref2. In the case that the touch sensor device is the photosensitive diode N1, the photosensitive diode N1 has its anode connected to the second reference signal terminal Ref2 and its cathode connected to the drain of the fourth switching transistor T4 when a low level signal is inputted at the second reference signal terminal Ref2, or has its cathode connected to the second reference signal terminal Ref2 and its anode connected to the drain of the fourth switching transistor T4 when a high level signal is inputted at the second reference signal terminal Ref2.

In particular, in the above pixel circuit according to the embodiment of the present disclosure, as shown in FIGS. 2a and 2c, the fourth switching transistor T4 may be a N-type transistor. Alternatively, as shown in FIGS. 2b and 2d, the fourth switching transistor T4 may be a P-type transistor. The present disclosure is not limited to any of the above types of the transistor. During the touch sensing period of the touch control phase, the fourth switching transistor T4 is turned on under the control of the third signal control terminal T3. The turned-on fourth switching transistor T4 connects the first node and a terminal of the touch sensor device. In the case that the touch sensor device is the variable capacitor C2, when a touch occurs, a voltage difference across the variable capacitor C2 and thus the voltage at the first node P1 varies. In the case that the touch sensor device is the photosensitive diode N1, when a touch occurs, the photosensitive diode N1 generates a leakage current in response to light and causes variation in the voltage at the first node P1.

In an implementation, in the above pixel circuit according to the embodiment of the present disclosure, as shown in FIGS. 2a-2d, the touch reading module 05 may include a fifth switching transistor T5 having its gate connected to the fourth signal control terminal CT4, its source connected to the data signal terminal Data and its drain connected to the second node P2.

In particular, in the above pixel circuit according to the embodiment of the present disclosure, as shown in FIGS. 2a and 2c, the fifth switching transistor T5 may be a N-type transistor. Alternatively, as shown in FIGS. 2b and 2d, the fifth switching transistor T5 may be a P-type transistor. The present disclosure is not limited to any of the above types of the transistor. During the touch sensing period of the touch control phase, the fifth switching transistor T5 is turned on under the control of the fourth signal control terminal CT4. The turned-on fifth switching transistor T5 connects the data signal terminal Data and the second node P2 (i.e., the source of the driving transistor D1). The light emitting module 07 connects the drain of the driving transistor D1 and the signal detection output terminal OUT to cause the driving transistor D1 to output a touch control signal to the signal detection output terminal OUT under the control of the gate voltage.

In an implementation, in the above pixel circuit according to the embodiment of the present disclosure, as shown in FIGS. 2a-2d, the light emitting module 07 may further include a sixth switching transistor T6 having its gate connected to the fifth signal control terminal CT5, its source connected to the output terminal of the driver module 03 and to an input terminal of the light emitting device 06, and its drain connected to an output terminal of the light emitting device 06, to the second reference signal terminal Ref2 and to the signal detection output terminal OUT.

In particular, in the above pixel circuit according to the embodiment of the present disclosure, as shown in FIGS. 2a and 2c, the sixth switching transistor T6 may be a N-type transistor. Alternatively, as shown in FIGS. 2b and 2d, the sixth switching transistor T6 may be a P-type transistor. The present disclosure is not limited to any of the above types of the transistor. During the touch control phase, the initialization period, the compensating period and the data writing period of the display phase, the sixth switching transistor T6 is turned on under the control of the fifth signal control terminal CT5. The turned-on sixth switching transistor T6 connects the output terminal of the driver module 03 and the second reference signal terminal Ref2, such that the light emitting device 06 is in a shorted state. During the light emitting period of the display phase, the sixth switching transistor T6 is in an off state and the driving transistor D1 drives the light emitting device 06 to emit light.

It is to be noted that each switching transistor or driving transistor as mentioned above may be a Thin Film Transistor (TFT) or a Metal Oxide Semiconductor (MOS) Field Effect Transistor (FET). The present disclosure is not limited to any of the above transistors. In an implementation, the source and the drain of each transistor are exchangeable and the present disclosure is not limited thereto. In describing the embodiments, the TFT will be used as an example.

Further, the switching transistors and driving transistors in the pixel circuit as mentioned above may all be P-type transistors or N-type transistors, in order to simplify the manufacture process for the pixel circuit.

In the following, the operations of the pixel circuit according to the embodiment of the present disclosure will be detailed in conjunction with its structure and timing sequence. In the first embodiment, the switching transistors and driving transistors in the pixel circuit are all N-type transistors; whereas in the second embodiment, the switching transistors and driving transistors in the pixel circuit are all P-type transistors.

First Embodiment

Figure 3A:
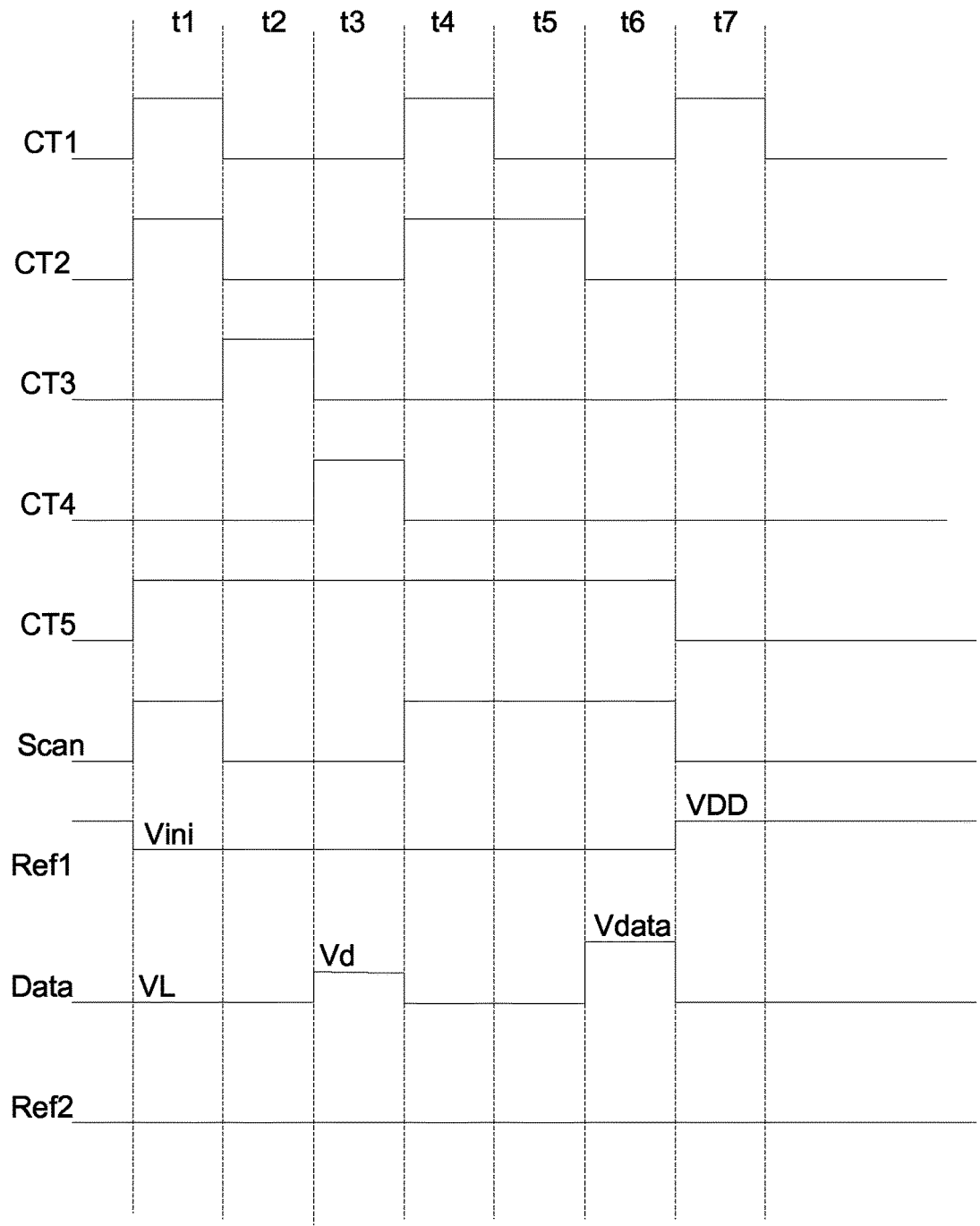
FIGS. 3a and 3b are schematic diagrams showing timing sequences according to a first embodiment and a second embodiment of the present disclosure.

In the following, the operations of the pixel circuit according to this embodiment of the present disclosure will be detailed in conjunction with the pixel circuit as shown in FIG. 2a and the input/output (I/O) timing sequence diagram for FIG. 2a as shown in FIG. 3a. In particular, seven periods, t1-t7, in the I/O timing sequence diagram shown in FIG. 3a are selected. In the description below, a high level signal is represented by "1" and a low level signal is represented by "0".

During the period t1, CT1=1, CT2=1, CT3=0, CT4=0, CT5=1, Scan=1, Ref1=Vini and Ref2=0, Data=VL. Since CT1=1, CT2=1, CT5=1 and Scan=1, the first switching transistor T1, the second switching transistor T2, the third switching transistor T3 and the sixth switching transistor T6 are turned on. Since CT3=0 and CT4=0, the fourth switching transistor T4 and the fifth switching transistor T5 are turned off. The turned-on sixth switching transistor T6 connects the drain of the driving transistor D1 and the second reference signal terminal Ref2, such that the light emitting device 06 is in a shorted state, i.e., a non-light-emitting state. The turned-on first switching transistor T1 and second switching transistor T2 connect the first reference signal terminal Ref1 and the first node P1, such that the voltage Vini inputted at the first reference signal terminal Ref1 is transferred to the first node P1 (i.e., the right terminal of the storage capacitor C1). In this case, the voltage at the right terminal of the storage capacitor C1 is Vini. The turned-on third switching transistor T3 connects the data signal terminal Data and the third node P3, such that the voltage VL inputted at the data signal terminal Data is transferred to the third node P3 (i.e., the left terminal of the storage capacitor C1). In this case, the voltage at the left terminal of the storage capacitor C1 is VL. In this period, the voltage at the first node, i.e., the gate voltage of the driving transistor D1, is initialized as Vini, so as to ensure that the driving transistor D1 will be in a saturated amplification state in the subsequent operation phases. The period t1 is an initialization period of the touch control phase.

During the period t2, CT1=0, CT2=0, CT3=1, CT4=0, CT5=1, Scan=0, Ref1=Vini, Ref2=0 and Data=VL. Since CT1=0, CT2=0, CT4=0 and Scan=0, the first switching transistor T1, the second switching transistor T2, the third switching transistor T3 and the fifth switching transistor T5 are turned off. Since CT3=1 and CT5=1, the fourth switching transistor T4 and the sixth switching transistor T6 are turned on. The turned-on sixth switching transistor T6 cause the light emitting device 06 to be in a non-light-emitting state. The turned-on fourth switching transistor T4 connects the first node P1 and one terminal of the touch sensor device. In the case that the touch sensor device is the variable capacitor C2, when a touch occurs, a voltage difference across the variable capacitor C2 and thus the voltage at the first node P1 varies. In the case that the touch sensor device is the photosensitive diode N1, when a touch occurs, the photosensitive diode N1 generates a leakage current in response to light and causes variation in the voltage at the first node P1. The period t2 is a touch sensing period of the touch control phase.

During the period t3, CT1=0, CT2=0, CT3=0, CT4=1, CT5=1, Scan=0, Ref1=Vini, Ref2=0 and Data=Vd. Since CT1=0, CT2=0, CT3=0 and Scan=0, the first switching transistor T1, the second switching transistor T2, the third switching transistor T3 and the fourth switching transistor T4 are turned off. Since CT4=1 and CT5=1, the fifth switching transistor T5 and the sixth switching transistor T6 are turned on. The turned-on sixth switching transistor T6 cause the light emitting device 06 to be in a non-light-emitting state. The turned-on fifth switching transistor T5 connects the data signal terminal Data and the second node P2. Since the driving transistor D1 is in a saturated and on state, it can be seen from the above period that the gate voltage of the driving transistor D1 varies, i.e., in different voltage states, as a touch occurs. In this case, when a voltage Vd higher than VL is inputted at the data signal terminal Data, the driving transistor D1 will output different currents accordingly, which will be outputted to the signal detection output terminal OUT via the turned-on sixth switching transistor T6. That is, the driving transistor D1 output a touch control signal to the signal detection output terminal OUT under the control of its gate voltage. Hence, it is possible to detect whether a touch occurs by detecting the current signal at the signal detection output terminal OUT. The period t3 is a touch reading period of the touch control phase.

During the period t4, CT1=1, CT2=1, CT3=0, CT4=0, CT5=1, Scan=1, Ref1=Vini, Ref2=0 and Data=VL. Since CT1=1, CT2=1, CT5=1 and Scan=1, the first switching transistor T1, the second switching transistor T2, the third switching transistor T3 and the sixth switching transistor T6 are turned on. Since CT3=0 and CT4=0, the fourth switching transistor T4 and the fifth switching transistor T5 are turned off. The operation states of the respective transistors in this period are the same as those in the initialization period of the touch control phase. Since a touch may have occurred during the previous period, the gate voltage of the driving transistor D1 may have changed. Hence, it may be required to initialize the gate of the driving transistor D1 again to remove the impact of the variation in the gate voltage of the driving transistor D1 during the touch control phase on the operation state of the driving transistor D1 in the subsequent periods. The period t4 is an initialization period of the display phase.

During the period t5, CT1=0, CT2=1, CT3=0, CT4=0, CT5=1, Scan=1, Ref1=Vini, Ref2=0 and Data=VL. Since CT2=1, CT5=1 and Scan=1, the second switching transistor T2, the third switching transistor T3 and the sixth switching transistor T6 are turned on. Since CT1=0, CT3=0 and CT4=0, the first switching transistor T1, the fourth switching transistor T4 and the fifth switching transistor T5 are turned off. The turned-on sixth switching transistor T6 cause the light emitting device 06 to be in a non-light-emitting state. The turned-on second switching transistor T2 and the driving transistor D1 constitute a discharging loop, such that the voltage at the first node P1 is discharged to a threshold voltage Vth of the driving transistor D1, which allows compensating for the threshold voltage Vth of the driving transistor D1. The turned-on third switching transistor T3 transfers the voltage signal VL inputted at the data signal terminal Data to the left terminal of the storage capacitor C1. At this time, the voltage difference across the storage capacitor C1 is VL−Vth. The period t5 is a compensating period of the display phase.

During the period t6, CT1=0, CT2=0, CT3=0, CT4=0, CT5=1, Scan=1, Ref1=Vini, Ref2=0 and Data=Vdata. Since CT5=1 and Scan=1, the third switching transistor T3 and the sixth switching transistor T6 are turned on. Since CT1=0, CT2=0, CT3=0 and CT4=0, the first switching transistor T1, the second switching transistor T2, the fourth switching transistor T4 and the fifth switching transistor T5 are turned off. The turned-on sixth switching transistor T6 cause the light emitting device 06 to be in a non-light-emitting state. The turned-on third switching transistor T3 transfers the data signal Vdata inputted at the data signal terminal Data to the third node P3. At this time, the voltage at the left terminal of the storage capacitor C1 becomes Vdata. Since the voltage difference across the storage capacitor C1 was VL−Vth during the previous period, the voltage at the right terminal of the storage capacitor C1 will be Vdata−VL+Vth. In this case, the driving transistor D1 is in the turned-on state. The period t6 is a data writing period of the display phase.

During the period t7, CT1=1, CT2=0, CT3=0, CT4=0, CT5=0, Scan=0, Ref1=VDD, Ref2=0 and Data=0. Since CT1=1, the first switching transistor T1 is turned on. Since Scan=0, CT2=0, CT3=0, CT4=0 and CT5=0, the second switching transistor T2, the third switching transistor T3, the fourth switching transistor T4, the fifth switching transistor T5 and the sixth switching transistor T6 are turned off. The turned-on first switching transistor T1 transfers the voltage signal VDD inputted at the first reference signal terminal to the source of the driving transistor D1, such that the driving transistor D1 drives the light emitting device 06 to emit light. It can be seen from the previous period that the gate voltage of the driving transistor D1 is Vdata−VL+Vth. Thus, the driving current that drives the light emitting device 06 to emit light is I=K(Vgs−Vth)$^2$=K(Vdata−VL+Vth−Vth)$^2$=K (Vdata−VL)$^2$, where Vgs is the voltage difference between the gate and the source of the driving transistor D1, K is a constant dependent on a process parameter and a geometrical dimension of the driving transistor D1. Thus, the driving current that drives the light emitting device 06 to emit light is independent from the threshold voltage of the driving transistor D1, such that the impact of the threshold voltage of the driving transistor D1 on the light emission luminance of the light emitting device can be removed and the uniformity of the light emission luminance of the light emitting device can be improved.

In the subsequent periods, the respective control signals are the same as those in the period t7 and the operation states of the respective control signals are the same as those in the period t7. The light emitting device 06 remains in the light emitting state, until a high level state occurs at the fifth switching transistor T5.

Second Embodiment

Figure 3B:
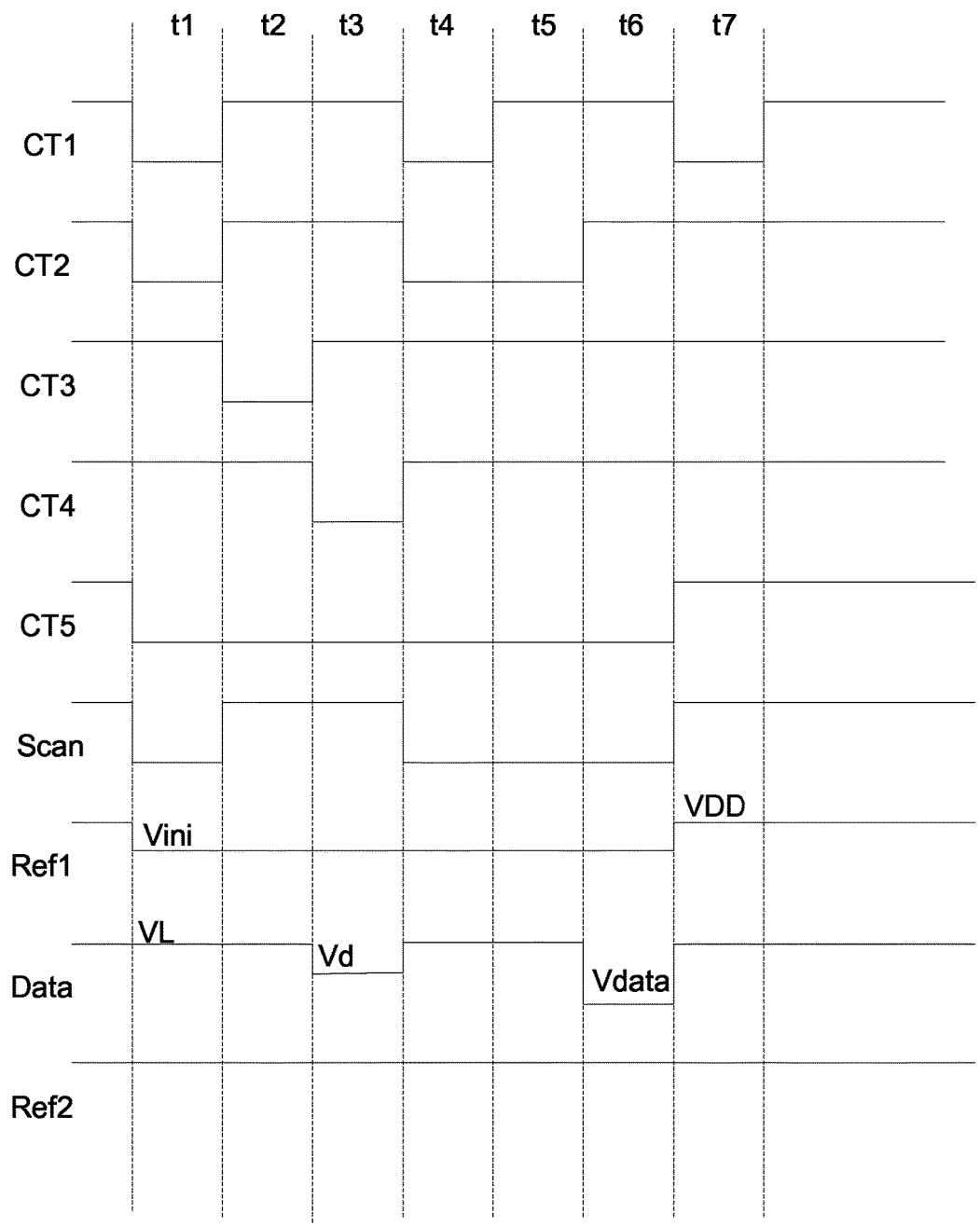

In the following, the operations of the pixel circuit according to this embodiment of the present disclosure will be detailed in conjunction with the pixel circuit as shown in FIG. 2c and the input/output (I/O) timing sequence diagram for FIG. 2c as shown in FIG. 3b. In particular, seven periods, t1-t7, in the I/O timing sequence diagram shown in FIG. 3b are selected. In the description below, a high level signal is represented by "1" and a low level signal is represented by "0".

During the period t1, CT1=0, CT2=0, CT3=1, CT4=1, CT5=0, Scan=0, Ref1=Vini and Ref2=1, Data=VL. Since CT1=0, CT2=0, CT5=0 and Scan=0, the first switching transistor T1, the second switching transistor T2, the third switching transistor T3 and the sixth switching transistor T6 are turned on. Since CT3=1 and CT4=1, the fourth switching transistor T4 and the fifth switching transistor T5 are turned off. The turned-on sixth switching transistor T6 connects the drain of the driving transistor D1 and the second reference signal terminal Ref2, such that the light emitting device 06 is in a shorted state, i.e., a non-light-emitting state. The turned-on first switching transistor T1 and second switching transistor T2 connect the first reference signal terminal Ref1 and the first node P1, such that the voltage Vini inputted at the first reference signal terminal Ref1 is transferred to the first node P1 (i.e., the right terminal of the storage capacitor C1). In this case, the voltage at the right terminal of the storage capacitor C1 is Vini. The turned-on third switching transistor T3 connects the data signal terminal Data and the third node P3, such that the voltage VL inputted at the data signal terminal Data is transferred to the third node P3 (i.e., the left terminal of the storage capacitor C1). In this case, the voltage at the left terminal of the storage capacitor C1 is VL. In this period, the voltage at the first node, i.e., the gate voltage of the driving transistor D1, is initialized as Vini, so as to ensure that the driving transistor D1 will be in a saturated amplification state in the subsequent operation phases. The period t1 is an initialization period of the touch control phase.

During the period t2, CT1=1, CT2=1, CT3=0, CT4=1, CT5=0, Scan=1, Ref1=Vini, Ref2=1 and Data=VL. Since CT1=1, CT2=1, CT4=1 and Scan=1, the first switching transistor T1, the second switching transistor T2, the third switching transistor T3 and the fifth switching transistor T5 are turned off. Since CT3=0 and CT5=0, the fourth switching transistor T4 and the sixth switching transistor T6 are turned on. The turned-on sixth switching transistor T6 cause the light emitting device 06 to be in a non-light-emitting state. The turned-on fourth switching transistor T4 connects the first node P1 and one terminal of the touch sensor device. In the case that the touch sensor device is the variable capacitor C2, when a touch occurs, a voltage difference across the variable capacitor C2 and thus the voltage at the first node P1 varies. In the case that the touch sensor device is the photosensitive diode N1, when a touch occurs, the photosensitive diode N1 generates a leakage current in response to light and causes variation in the voltage at the first node P1. The period t2 is a touch sensing period of the touch control phase.

During the period t3, CT1=1, CT2=1, CT3=1, CT4=0, CT5=0, Scan=1, Ref1=Vini, Ref2=1 and Data=Vd. Since CT1=1, CT2=1, CT3=1 and Scan=1, the first switching transistor T1, the second switching transistor T2, the third switching transistor T3 and the fourth switching transistor T4 are turned off. Since CT4=0 and CT5=0, the fifth switching transistor T5 and the sixth switching transistor T6 are turned on. The turned-on sixth switching transistor T6 cause the light emitting device 06 to be in a non-light-emitting state. The turned-on fifth switching transistor T5 connects the data signal terminal Data and the second node P2. Since the driving transistor D1 is in a saturated and on state, it can be seen from the above period that the gate voltage of the driving transistor D1 varies, i.e., in different voltage states, as a touch occurs. In this case, when a voltage Vd higher than VL is inputted at the data signal terminal Data, the driving transistor D1 will output different currents accordingly, which will be outputted to the signal detection output terminal OUT via the turned-on sixth switching transistor T6. That is, the driving transistor D1 output a touch control signal to the signal detection output terminal OUT under the control of its gate voltage. Hence, it is possible to detect whether a touch occurs by detecting the current signal at the signal detection output terminal OUT. The period t3 is a touch reading period of the touch control phase.

During the period t4, CT1=0, CT2=0, CT3=1, CT4=1, CT5=0, Scan=0, Ref1=Vini, Ref2=1 and Data=VL. Since CT1=0, CT2=0, CT5=0 and Scan=0, the first switching transistor T1, the second switching transistor T2, the third switching transistor T3 and the sixth switching transistor T6 are turned on. Since CT3=1 and CT4=1, the fourth switching transistor T4 and the fifth switching transistor T5 are turned off. The operation states of the respective transistors in this period are the same as those in the initialization period of the touch control phase. Since a touch may have occurred during the previous period, the gate voltage of the driving transistor D1 may have changed. Hence, it may be required to initialize the gate of the driving transistor D1 again to remove the impact of the variation in the gate voltage of the driving transistor D1 during the touch control phase on the operation state of the driving transistor D1 in the subsequent periods. The period t4 is an initialization period of the display phase.

During the period t5, CT1=1, CT2=0, CT3=1, CT4=1, CT5=0, Scan=0, Ref1=Vini, Ref2=1 and Data=VL. Since CT2=0, CT5=0 and Scan=0, the second switching transistor T2, the third switching transistor T3 and the sixth switching transistor T6 are turned on. Since CT1=1, CT3=1 and CT4=1, the first switching transistor T1, the fourth switching transistor T4 and the fifth switching transistor T5 are turned off. The turned-on sixth switching transistor T6 cause the light emitting device 06 to be in a non-light-emitting state. The turned-on second switching transistor T2 and the driving transistor D1 constitute a discharging loop, such that the voltage at the first node P1 is discharged to a threshold voltage Vth of the driving transistor D1, which allows compensating for the threshold voltage Vth of the driving transistor D1. The turned-on third switching transistor T3 transfers the voltage signal VL inputted at the data signal terminal Data to the left terminal of the storage capacitor C1. At this time, the voltage difference across the storage capacitor C1 is VL−Vth. The period t5 is a compensating period of the display phase.

During the period t6, CT1=1, CT2=1, CT3=1, CT4=1, CT5=0, Scan=0, Ref1=Vini, Ref2=1 and Data=Vdata. Since CT5=0 and Scan=0, the third switching transistor T3 and the sixth switching transistor T6 are turned on. Since CT1=1, CT2=1, CT3=1 and CT4=1, the first switching transistor T1, the second switching transistor T2, the fourth switching transistor T4 and the fifth switching transistor T5 are turned off. The turned-on sixth switching transistor T6 cause the light emitting device 06 to be in a non-light-emitting state. The turned-on third switching transistor T3 transfers the data signal Vdata inputted at the data signal terminal Data to the third node P3. At this time, the voltage at the left terminal of the storage capacitor C1 becomes Vdata. Since the voltage difference across the storage capacitor C1 was VL−Vth during the previous period, the voltage at the right terminal of the storage capacitor C1 will be Vdata−VL+Vth. In this case, the driving transistor D1 is in the turned-on state. The period t6 is a data writing period of the display phase.

During the period t7, CT1=0, CT2=1, CT3=1, CT4=1, CT5=1, Scan=1, Ref1=VDD, Ref2=1 and Data=0. Since CT1=0, the first switching transistor T1 is turned on. Since Scan=1, CT2=1, CT3=1, CT4=1 and CT5=1, the second switching transistor T2, the third switching transistor T3, the fourth switching transistor T4, the fifth switching transistor T5 and the sixth switching transistor T6 are turned off. The turned-on first switching transistor T1 transfers the voltage signal VDD inputted at the first reference signal terminal to the source of the driving transistor D1, such that the driving transistor D1 drives the light emitting device 06 to emit light. It can be seen from the previous period that the gate voltage of the driving transistor D1 is Vdata−VL+Vth. Thus, the driving current that drives the light emitting device 06 to emit light is $I=K(Vgs-Vth)^2=K(Vdata-VL+Vth-Vth)^2=K(Vdata-VL)^2$, where Vgs is the voltage difference between the gate and the source of the driving transistor D1, K is a constant dependent on a process parameter and a geometrical dimension of the driving transistor D1. Thus, the driving current that drives the light emitting device 06 to emit light is independent from the threshold voltage of the driving transistor D1, such that the impact of the threshold voltage of the driving transistor D1 on the light emission luminance of the light emitting device can be removed and the uniformity of the light emission luminance of the light emitting device can be improved.

In the subsequent periods, the respective control signals are the same as those in the period t7 and the operation states of the respective control signals are the same as those in the period t7. The light emitting device 06 remains in the light emitting state, until a high level state occurs at the fifth switching transistor T5.

Based on the same inventive concept as above, an organic electroluminescence display panel is provided according to an embodiment of the present disclosure, including the pixel circuit according to the above embodiments. Since the principle of the organic electroluminescence display panel to solve the problem is similar to that of the pixel circuit, for the implementation of the organic electroluminescence display panel, reference can be made to the implementation of the pixel circuit and details thereof will be omitted here.

Based on the same inventive concept as above, a display apparatus is provided according to an embodiment of the present disclosure, including the organic electroluminescence display panel according to the above embodiment. The display apparatus may be a cell phone, a tablet computer, a television set, a display, a notebook computer, a digital picture frame, a navigator or any other product or component having a display function. Since the principle of the display apparatus to solve the problem is similar to that of the organic electroluminescence display panel, for the implementation of the display apparatus, reference can be made to the implementation of the organic electroluminescence display panel and details thereof will be omitted here.

The present disclosure provides a pixel circuit, an organic electroluminescence display panel and a display apparatus. During an initialization period of a touch control phase and a display phase, the initialization module and the charging control module initialize a first node. During a touch sensing period of the touch control phase, the touch sensor module adjusts a voltage at the first node based on a touch control state. During a touch reading period of the touch control phase, the touch reading module connects the data signal terminal and the second node and the light emitting module connects the output terminal of the driver module and the signal detection output terminal to cause the driver module to output a touch control signal under the control of the voltage at the first node, so as to achieve a touch control function. During a compensating period and a data writing period of the display phase, the charging control module and the initialization module write data into the first node. During a light emitting period of the display phase, the initialization module connects the first reference signal terminal and the input terminal of the driver module to cause the driver module to drive the light emitting device in the light emitting module to emit light, so as to allow the light emitting device to achieve its light emitting function normally. Compared with the conventional pixel circuit, the pixel circuit according to the embodiment of the present disclosure has integrated touch control and display functions. In this way, the manufacture cost can be saved when compared with the separated provided display driver circuit and touch control circuit, so as to simplify the circuit structure and to reduce the thickness of the display panel.

Obviously, various modifications and variants to the present disclosure can be made by those skilled in the art without departing from the spirit and scope of the present disclosure. Therefore, these modifications and variants are to be compassed by the scope of the claims as attached and equivalents thereof.

What is claimed is:

1. A pixel circuit, comprising an initialization module, a charging control module, a driver module, a touch sensor module, a touch reading module and a light emitting module having a light emitting device, wherein:
   the driver module has a control terminal connected to a first node, an input terminal connected to a second node and an output terminal connected to an input terminal of the light emitting module;

the charging control module has a control terminal connected to a scan signal terminal, an input terminal connected to a data signal terminal and an output terminal connected to a third node;

the initialization module is connected among the first node, the second node, the third node, a first reference signal terminal, a first signal control terminal and a second signal control terminal;

the touch sensor module is connected among the first node, a third signal control terminal and a second reference signal terminal;

the touch reading module has a control terminal connected to a fourth signal control terminal, an input terminal connected to the data signal terminal and an output terminal connected to the second node;

the light emitting module has a control terminal connected to a fifth signal control terminal and an output terminal connected to the second reference signal terminal and to a signal detection output terminal, the initialization module, under the control of the first signal control terminal and the second signal control terminal, and the charging control module, under the control of the scan signal terminal, are operable to initialize the first node during an initialization period of a touch control phase and an initialization period of a display phase;

the touch sensor module is operable to adjust a voltage at the first node during a touch sensing period of the touch control phase based on a touch control state under the control of the third signal control terminal;

the touch reading module is operable to connect the data signal terminal and the second node during a touch reading period of the touch control phase under the control of the fourth signal control terminal and the light emitting module is operable to connect the output terminal of the driver module and the signal detection output terminal during the touch reading period of the touch control phase under the control of the fifth signal control terminal to cause the driver module to output a touch control signal under the control of the voltage at the first node;

the charging control module, under the control of the scan signal terminal, and the initialization module, under the control of the first signal control terminal and the second signal control terminal, are operable to write data into the first node during a compensating period of the display phase and a data writing period of the display phase; and the initialization module is operable to connect the first reference signal terminal and the input terminal of the driver module during a light emitting period of the display phase under the control of the first signal control terminal to cause the driver module to drive the light emitting device in the light emitting module to emit light;

wherein the initialization period of the touch control phase, the touch sensing period of the touch control phase, the touch reading period of the touch control phase, the initialization period of the display phase, the compensating period of the display phase, the data writing period of the display phase, and the light emitting period of the display phase occur sequentially.

2. The pixel circuit of claim 1, wherein the initialization module comprises a first switching transistor, a second switching transistor and a storage capacitor, wherein:

the first switching transistor has its gate connected to the first signal control terminal, its source connected to the first reference signal terminal and its drain connected to the second node, the second switching transistor has its gate connected to the second signal control terminal, its source connected to the second node and its drain connected to the first node, and the storage capacitor is connected between the first node and the third node.

3. The pixel circuit of claim 1, wherein the charging control module comprises a third switching transistor having its gate connected to the scan signal terminal, its source connected to the data signal terminal and its drain connected to the third node.

4. The pixel circuit of claim 1, wherein the driver module comprises a driving transistor having its gate connected to the first node, its source connected to the second node and its drain connected to the input terminal of the light emitting module.

5. The pixel circuit of claim 1, wherein the touch sensor module comprises a fourth switching transistor and a touch sensor device, wherein:

the fourth switching transistor has its gate connected to the third signal control terminal, its source connected to the first node and its drain connected to a terminal of the touch sensor device, and the touch sensor device has another terminal connected to the second reference signal terminal.

6. The pixel circuit of claim 5, wherein the touch sensor device comprises:

a variable capacitor having a terminal connected to the drain of the fourth switching transistor and another terminal connected to the second reference signal terminal; or a photosensitive diode having its anode connected to the second reference signal terminal and its cathode connected to the drain of the fourth switching transistor when a low level signal is inputted at the second reference signal terminal, or having its cathode connected to the second reference signal terminal and its anode connected to the drain of the fourth switching transistor when a high level signal is inputted at the second reference signal terminal.

7. The pixel circuit of claim 1, wherein the touch reading module comprises a fifth switching transistor having its gate connected to the fourth signal control terminal, its source connected to the data signal terminal and its drain connected to the second node.

8. The pixel circuit of claim 1, wherein the light emitting module further comprises a sixth switching transistor having its gate connected to the fifth signal control terminal, its source connected to the output terminal of the driver module and to an input terminal of the light emitting device, and its drain connected to an output terminal of the light emitting device, to the second reference signal terminal and to the signal detection output terminal.

9. An organic electroluminescence display panel, comprising the pixel circuit of claim 1.

10. The organic electroluminescence display panel of claim 9, wherein the initialization module comprises: a first switching transistor, a second switching transistor and a storage capacitor, wherein:

the first switching transistor has its gate connected to the first signal control terminal, its source connected to the first reference signal terminal and its drain connected to the second node, the second switching transistor has its gate connected to the second signal control terminal, its source connected to the second node and its drain connected to the first node, and the storage capacitor is connected between the first node and the third node.

11. The organic electroluminescence display panel of claim 9, wherein the charging control module comprises a third switching transistor having its gate connected to the scan signal terminal, its source connected to the data signal terminal and its drain connected to the third node.

12. The organic electroluminescence display panel of claim 9, wherein the driver module comprises a driving transistor having its gate connected to the first node, its source connected to the second node and its drain connected to the input terminal of the light emitting module.

13. The organic electroluminescence display panel of claim 9, wherein the touch sensor module comprises a fourth switching transistor and a touch sensor device, wherein:

the fourth switching transistor has its gate connected to the third signal control terminal, its source connected to the first node and its drain connected to a terminal of the touch sensor device, and the touch sensor device has a terminal connected to the second reference signal terminal.

14. The organic electroluminescence display panel of claim 13, wherein the touch sensor device comprises:

a variable capacitor having a terminal connected to the drain of the fourth switching transistor and another terminal connected to the second reference signal terminal; or a photosensitive diode having its anode connected to the second reference signal terminal and its cathode connected to the drain of the fourth switching transistor when a low level signal is inputted at the second reference signal terminal, or having its cathode connected to the second reference signal terminal and its anode connected to the drain of the fourth switching transistor when a high level signal is inputted at the second reference signal terminal.

15. The organic electroluminescence display panel of claim 9, wherein the touch reading module comprises a fifth switching transistor having its gate connected to the fourth signal control terminal, its source connected to the data signal terminal and its drain connected to the second node.

16. The organic electroluminescence display panel of claim 9, wherein the light emitting module further comprises a sixth switching transistor having its gate connected to the fifth signal control terminal, its source connected to the output terminal of the driver module and to an input terminal of the light emitting device, and its drain connected to an output terminal of the light emitting device, to the second reference signal terminal and to the signal detection output terminal.

17. A display apparatus, comprising the organic electroluminescence display panel of claim 9.

* * * * *